March 3, 1964   V. WOUK ETAL   3,123,760
RECTIFIER SHIELD
Filed March 15, 1960

VICTOR WOUK
JESSE STITZER
JULIAN WASSERMAN
INVENTORS

BY Ralph E. Bitner
ATTORNEY

United States Patent Office 3,123,760
Patented Mar. 3, 1964

3,123,760
RECTIFIER SHIELD
Victor Wouk, New York, Jesse Stitzer, Briarcliff Manor, and Julian Wasserman, Jamaica, N.Y., assignors, by mesne assignments, to Raytheon Company, a corporation of Delaware
Filed Mar. 15, 1960, Ser. No. 15,163
6 Claims. (Cl. 321—11)

This invention relates to a rectifier shield which corrects capacities in a series (or series parallel) rectifier array. The invention has particular reference to one or more shields which establish capacities of unequal value to parts of a rectifier array and thereby compensate for unequal voltage distribution.

The application of semiconductor rectifiers to high voltage systems produces problems of unequal distribution of voltages across each individual rectifier when the reverse half of the wave is applied to the rectifier stack. During the application of the voltage wave which produces conduction in the rectifiers there is no problem regarding voltage distribution because the rectifier resistance is quite low and most of the voltage is applied across the load. When the other half of the wave is applied to the rectifiers, the resistance to current flow is quite high, of the order of several megohms, and the principal current which flows through the rectifiers is due to the capacity between the semiconductor electrodes. The capacity currents produce unequal voltage distribution as will be explained later. It is for this reason that shields are employed to make the voltage distribution substantially equal across each of the rectifier units and thereby prevent failure of units which otherwise would experience very high voltage between their electrodes.

One of the objects of this invention is to provide an improved system of rectifier shields which avoids one or more of the disadvantages and limitations of prior art arrangements.

Another object of the invention is to compensate for unequal capacity currents which normally would flow through the rectifier units during the application of reverse voltages.

Another object of the invention is to provide a double shielding arrangement which can be made to fully compensate for all voltage variations along the rectifier array.

Another object of the invention is to provide a compact container for a large number of rectifier units connected for rectifying an alternating current supply and producing a high voltage direct current across a load.

Another object of the invention is to provide a shield for eliminating the effects of external fields.

The invention comprises a shield for a rectifier array with parts of the shield positioned close to some of the rectifier units and other parts of the shield at a much greater distance from the rectifier units. One feature of the invention includes the application of two shields, one of which is connected to the anode end of the rectifier array and the other shield connected to the other end of the alternating current transformer secondary.

For a better understanding of the present invention, together with other and further objects thereof, reference is made to the following description taken in connection with the accompanying drawings.

Figure 1:
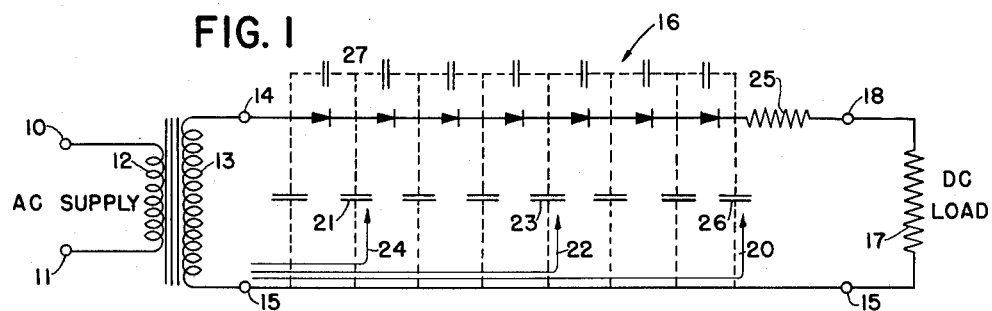
FIG. 1 is a schematic diagram of connections showing a single rectifier array connected between an A.C. supply and a D.C. load.

Referring now to FIG. 1, a high voltage rectifier circuit is shown with A.C. supply terminals 10, 11, connected to a primary transformer winding 12. The secondary winding 13 is connected to terminal 14 of an array of rectifier units 16 while the other side of the transformer is connected to terminal 15 and one side of a direct current load. This latter connection is to the negative terminal of the load and is generally grounded to the case or to some portion of the supporting structure. The cathode end terminal 18 of the rectifier stack is connected to the other side of the load.

When terminal 14 is made positive by secondary winding 13, current flows through the rectifier units making terminal 18 positive and producing a current flow through the direct current load. During this half of the voltage wave there is no problem regarding voltage distribution because current through the rectifier units passes through a plurality of low resistances, generally about five ohms for each unit. During the reverse half of the wave when terminal 14 is made negative with respect to ground, the resistance of each unit is very high, of the order of several megohms, and the current flow is reduced to a minimum. Because of the high resistance of the units, the full voltage generated across winding 13 is applied across terminals 14 and 18 and the only currents which flow through the stack are the capacitive charging currents due to the distributed capacities of the rectifier units themselves and the capacities between the rectifier units and ground.

In FIG. 1 the distributed capacities are shown connected around the rectifier units with dotted lines and also connected between the rectifier units and the ground lead for purposes of explanation. It will be obvious from this figure that capacitative currents flowing from terminal 15 to terminal 14 from the ground conductor produce unequal voltage distribution across the rectifier units. One current path is illustrated by arrow 20 which passes through all the series capacities in the rectifier and thereby charges shunt capacitor 26.

Another current path is illustrated by arrow 22 which passes through half the series capacities of the rectifier units and charges capacitor 23. Still another current is illustrated by arrow 24 which passes through only one rectifier capacitor 21.

Only three current paths are indicated, there being a current for each capacitor between the rectifier stack and ground. It will be obvious from this figure that all the currents pass through the rectifier unit 27 connected to terminal 14 while only one capacity current passes through one of the rectifier units 25 near the terminal 18. The distribution of capacities produces an unequal distribution of currents and for this reason the voltage across rectifier unit 27 is many times the voltage across rectifier 25.

This unequal distribution of voltages means that rectifier 27 is liable to rupture and failure for any steady state voltage, transient in the system, or for any other form of overvoltage applied to the rectifier array.

Figure 2:
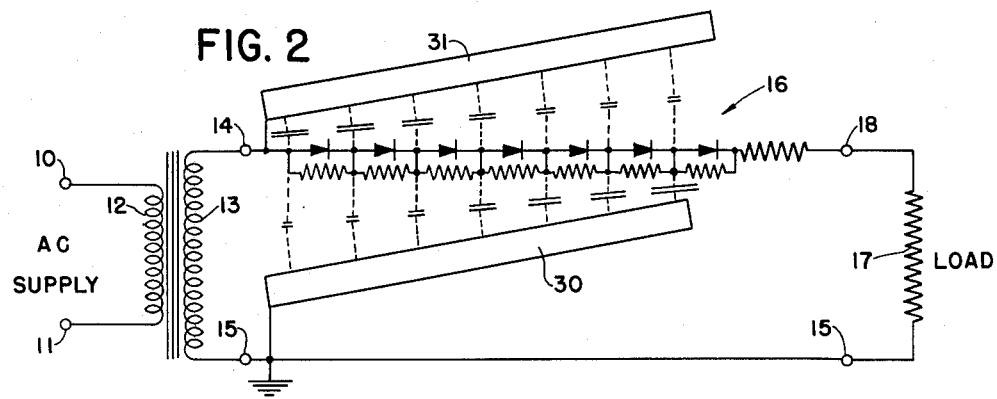
FIG. 2 is a schematic diagram of connections similar to FIG. 1 but having two shields for altering the distributed capacity.

The schematic diagram of FIG. 2 shows how the capacity distribution may be corrected by the use of shields. One of the shields 30 is connected to ground and while this shield increases the capacities from each rectifier unit, it stabilizes the capacity values and eliminates changes in distributed capacity which otherwise might occur due to shifting of external grounded objects. Shield 30 is placed closer to the rectifier units adjoining the positive terminal 18 and farther away from the rectifier units at the other end of the rectifier array connected to transformer winding 13. The distributed capacities are connected by the dotted lines, and the extent of the capacitor symbol lines indicates their approximate relative values.

A second shield 31 is positioned on the other side of the rectifier array 16 and is also positioned at an angle to the array being closer to the rectifier units connected to transformer winding 14 and farther away from the rectifier units connected to the positive terminal 18 of the load. This shield is connected directly to the transformer winding 13 and in this position it also creates a variable array of distributed capacities, shown in dotted lines. The values of the capacities formed by this shield vary in a manner similar to the capacities caused by shield 30 but are greater near terminal 14 and smaller near terminal 18.

The two shields 30 and 31 form a voltage divider by creating variable voltages to each rectifier unit and these voltage values are sufficient to compensate for the variation of voltages caused by the unequal distribution of currents as explained above in connection with FIG. 1. The result is a voltage distribution which is substantially the same for each rectifier unit, thereby permitting higher overall voltages without the probability of any one section of rectifier units having overvoltages and subject to failure.

Figure 3:
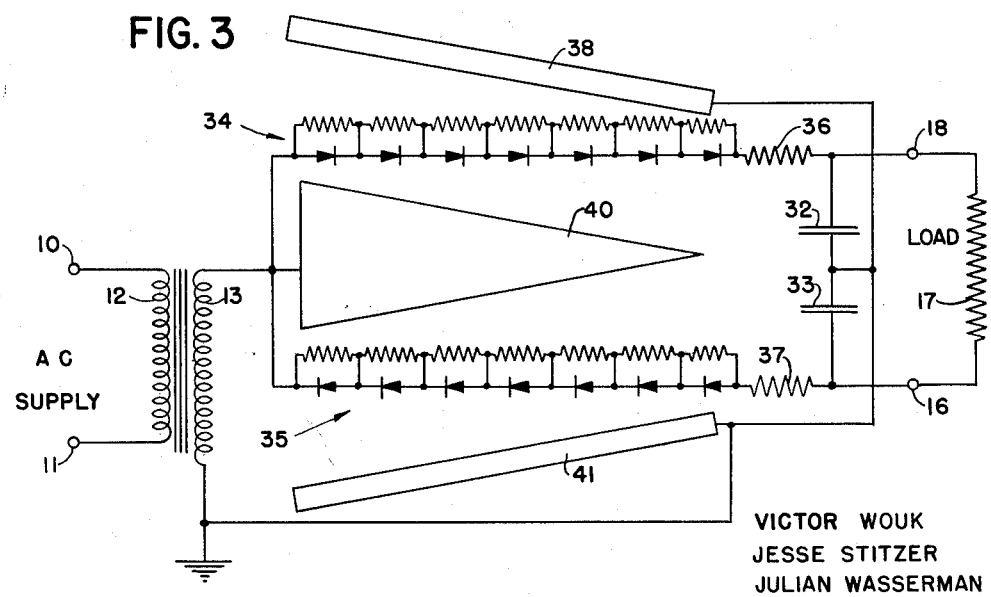
FIG. 3 is a schematic diagram of connections showing how a rectifier array may be connected to a voltage doubler circuit using an alternating current power supply.

The schematic diagram of connections shown in FIG. 3 is one practical application of the shielding device applied to a voltage doubler circuit. In this circuit, as in most voltage doubler circuits, the high voltage secondary winding 13 is applied to a connection between two capacitors 32 and 33. This connection is generally grounded. The other side of winding 13 is connected to the midpoint of a long rectifier array comprising two portions 34 and 35. The high voltage (cathode) end of rectifier array 34 is connected to the other side of capacitor 32 through a limiting resistor 36 and to the positive terminal 18 of load 17, while the negative end of the rectifier array 35 is connected to the ungrounded side of capacitor 33 through another limiting resistor 37 and the negative terminal 16 of load 17.

Each of the rectifier arrays 34 and 35 is supplied with conductive shields. Rectifiers 34 are surrounded by a grounded shield 38 on one side and a high voltage shield 40 on the other side which is connected to the high voltage end of winding 13. In a smiliar manner rectifier array 35 is surrounded by two shields, one shield 40 connected to winding 13 and the other shield 41 connected to ground. These shields alter the distributed capacity and produce uniform voltage distribution when the voltage applied to the rectifiers is in the reversed direction.

It will be obvious from the above description that similar shielding means can be applied to any form of rectifier arrays used in the production high voltage direct current derived from an alternating current supply.

In FIGS. 2 and 3 resistors are shown bridged across each rectifier unit. These resistors may range in value from one to ten megohms each but it has been found that best results are obtained when all the resistors have equal value in any one application. These resistors help to equalize the voltages across the rectifier units but their main use is to produce a high resistance path between the load terminals 15 and 18 in case the resistive portion of the load is disconnected and the supply line is open. In this situation capacitors 32 and 33 will be discharged through the series resistors within a very short time.

The foregoing disclosure and drawings are merely illustrative of the principles of this invention and are not to be interpreted in a limiting sense. The only limitations are to be determined from the scope of the appended claims.

We claim:

1. Shielding means for a plurality of rectifier units connected in series and subjected to pulsating potentials from a source of potential comprising, a high voltage first conductive shield connected to the anode end of said rectifier units and positioned adjacent to one side of said units, said first conductive shield including a conductive surface spaced closer to the anode end of said units than to the cathode end, and a grounded second conductive shield connected to one side of said potential source and positioned adjacent to the other side of the units, said grounded second shield including a conductive surface spaced closer to the cathode end of said units than to the anode end.

2. Shielding means for a plurality of rectifier units connected in series and subjected to alternating potentials from an A.C. source comprising, a high voltage first conductive shield connected to the anode end of said rectifier units and positioned adjacent to one side of a unit mounting plane, said first conductive shield including a conducting surface positioned at an acute angle to said plane and spaced closer to the anode end of said units than to the cathode end, and a grounded second conductive shield connected to one side of said A.C. source and positioned adjacent to the other side of said unit mounting plane, said grounded second shield including a conducting surface positioned at an acute angle to said plane and spaced closer to the anode end of said units than to the cathode end.

3. Shielding means for a plurality of rectifier units connected in series between an A.C. source of potential and a load comprising, a high voltage first conductive shield connected to the anode end of said rectifier units and positioned adjacent to one side of a mounting plane on which said units are assembled, said first conductive shield including a conducting surface positioned at an angle to said plane and spaced closer to the anode end of said units than to the cathode end for altering the distributed capacities across said units, and a grounded second conductive shield connected to one side of said A.C. source and positioned adjacent to the other side of said unit mounting plane, said grounded second shield including a conducting surface positioned at an acute angle to said plane and spaced closer to the cathode end of the units than to the anode end for altering the distributed capacities between the units and ground.

4. Shielding means as set forth in claim 3 wherein each of said rectifiers are shunted by a resistor.

5. Shielding means as set forth in claim 4 wherein said rectifier units are connected to the secondary of a transformer and are adapted to deliver pulsating direct current to a load.

6. Shielding means for a voltage doubler rectifier array having two sets of series connected rectifier units comprising; a first high voltage conductive shield connected to the anode end of a first series of rectifier units; said first conductive shield also connected to the cathode end of a second series of rectifier units; a source of A.C. potential having one terminal connected to said first shield; and a second and third conductive shield connected to the other terminal of the A.C. source, said second shield positioned adjacent to one side of said first series of rectifier units and mounted closer to the cathode end than the anode end; said third shield positioned adjacent to one side of said second series of rectifier units and mounted closer to the anode end than the cathode end.

References Cited in the file of this patent

UNITED STATES PATENTS

| | | |
|---|---|---|
| 1,043,117 | Von Lepel | Nov. 5, 1912 |
| 1,842,716 | De Ferranti | Jan. 26, 1932 |
| 1,867,419 | Peck | July 12, 1932 |
| 1,907,633 | Westermann | May 9, 1933 |